(12) United States Patent
Boodman et al.

(10) Patent No.: US 8,255,494 B1
(45) Date of Patent: *Aug. 28, 2012

(54) INSTALLABLE WEB APPLICATIONS

(75) Inventors: Aaron Boodman, San Francisco, CA (US); Erik Kay, Belmont, CA (US); Rafael Weinstein, San Francisco, CA (US); Matthew Perry, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,850

(22) Filed: Sep. 27, 2011

Related U.S. Application Data

(63) Continuation of application No. 13/110,878, filed on May 18, 2011.

(60) Provisional application No. 61/346,013, filed on May 18, 2010, provisional application No. 61/345,999, filed on May 18, 2010, provisional application No. 61/346,000, filed on May 18, 2010.

(51) Int. Cl.
*G06F 15/16* (2006.01)

(52) U.S. Cl. .......................... 709/219; 715/234; 715/749

(58) Field of Classification Search .................... 463/40, 463/42, 31, 16; 717/170; 709/219; 715/234, 715/749

See application file for complete search history.

(56) References Cited

U.S. PATENT DOCUMENTS

| | | | |
|---|---|---|---|
| 6,846,239 B2 * | 1/2005 | Washio | 463/40 |
| 2006/0075397 A1 * | 4/2006 | Kasahara | 717/170 |
| 2006/0142087 A1 * | 6/2006 | Chang et al. | 463/42 |
| 2007/0049371 A1 * | 3/2007 | Yang | 463/16 |
| 2007/0105627 A1 * | 5/2007 | Campbell | 463/40 |
| 2007/0265094 A1 * | 11/2007 | Tone et al. | 463/42 |
| 2008/0096656 A1 * | 4/2008 | LeMay et al. | 463/31 |
| 2008/0096668 A1 * | 4/2008 | Yoshioka | 463/42 |
| 2009/0170607 A1 * | 7/2009 | Chiao et al. | 463/42 |
| 2009/0209350 A1 * | 8/2009 | Kelly et al. | 463/42 |
| 2011/0177866 A1 * | 7/2011 | Kim | 463/42 |

OTHER PUBLICATIONS

"6.6 Offline Web Applications—HTML Standard", retrieved from http://www.whatwg.org/specs/web-apps/current-work/multipage/offline.html, May 18, 2011, 21 pages.

* cited by examiner

*Primary Examiner* — Jungwon Chang
(74) *Attorney, Agent, or Firm* — Brake Hughes Bellermann LLP

(57) ABSTRACT

According to one general aspect, a method of executing a web application installed on an apparatus may include executing, via a processor included by the apparatus, a web browser. The method may include loading, via the web browser, the web application. In some embodiments, the web application may include a manifest and at least a portion of a web site and wherein the web application was packaged as an installable entity. The method may further include managing, by the web browser, the execution of the web application. The method may include accessing, via the web browser, from a local storage medium one or more portions of the web site included by the web application. In some embodiments, the one or more portions of the web site may have been stored in the local storage medium when the web application was installed.

9 Claims, 7 Drawing Sheets

FIG. 5
500

```
{
"name": "NPR",
"description": "Listen to NPR",
"version": "1",                                              ── 502

"web_extent": {
    "origin": "http://www.npr.org",
    "paths": ["webapp/"]
},                                                            ── 504 launch:{
    "web-url": "/videos",
    "web-url": "/stories",
    "local-url": "/ui"
},                                                            ── 506

"permissions": {
    "unlimitedStorage",
    "notifications"},                                         ── 508

"icons": {
    "128": "icon_128.png"                                     ── 510
}
```

INSTALLABLE WEB APPLICATIONS

CROSS-REFERENCE TO RELATED APPLICATION

This application is a continuation of, and claims priority under 35 U.S.C. §120 to, application Ser. No. 13/110,878, filed on May 18, 2011, titled "INSTALLABLE WEB APPLICATIONS", which claims the benefit, under 35 U.S.C. §119, of U.S. Provisional Patent Application No. 61/345,999 "Installable Web Applications", U.S. Provisional Patent Application No. 61/346,000, "Web Store For Digital Goods", and U.S. Provisional Patent Application No. 61/346,013, "Chrome Extensions", all of which were filed on May 18, 2010. The disclosures of these patent applications are incorporated herein by reference in their entirety.

TECHNICAL FIELD

This description relates to web application and their execution via a web browser.

BACKGROUND

Traditionally, computing has involved the use of native applications or computer software designed to help a user complete a single task or multiple tasks. Traditionally, these native applications have been executed locally by a processor or computing device either directly by the processor or with the mediation or assistance of an operating system (OS). In general an operating system is a piece of software that provides a common set of services to aid the execution of a host of applications and, more importantly, provides a low-level interface for the hardware of the computer and manages hardware functions such as input and output, memory allocation etc. Generally, the operating system acts as an intermediary between application programs and the computer hardware, although the application code is usually executed directly by the hardware and will frequently call the OS or be interrupted by it. Frequently, the OS is represented as being "between" the hardware and the applications.

With the advent of the Internet, an application was created known as a "web browser". In this context, a "web browser" includes an application for retrieving, presenting, and traversing information resources on the World Wide Web or more generally the Internet. An information resource is generally identified by a Uniform Resource Identifier (URI) or a Uniform Resource Locator (URL) and may be a web page, image, video, or other piece of content. A web browser generally is executed by a processor and interacts with an underlying operating system as most traditional or native applications do.

Traditionally, a web browser may access a web site or a collection of web pages, scripts, etc. from a physically remote server or web server. The more advanced web sites may include active content (e.g., client-side scripts, server-side scripts, etc.) which allow content of information to be dynamically changed or asynchronously accessed. In general, these web sites would be loaded, processed, or displayed by a web browser without the installation of any permanent portion of the web site on the user's computer, although the web site may require the installation of a web-site agnostic third-party execution tool (e.g., Adobe Flash, Java Virtual Machine, etc.) or an individualized data file (e.g., a web cookie, etc.). However, in general, a user and web browser may traditionally browse and leave a traditional web site without substantial alteration or installation of the web site being stored on the user's local computing device.

SUMMARY

According to one general aspect, a method of executing a web application installed on an apparatus may include executing, via a processor included by the apparatus, a web browser. The method may include loading, via the web browser, the web application. In some embodiments, the web application may include a manifest and at least a portion of a web site and wherein the web application was packaged as an installable entity. The method may further include managing, by the web browser, the execution of the web application. The method may include accessing, via the web browser, from a local storage medium one or more portions of the web site included by the web application. In some embodiments, the one or more portions of the web site may have been stored in the local storage medium when the web application was installed.

According to another general aspect, an apparatus may include a processor, a local memory, a web browser and a web application. In various embodiments, the processor may be configured to execute executable code defining a web browser. In one embodiment, the local memory may be configured to store at least a portion of a web site associated with a web application. In some embodiments, the web application comprising at least a portion of a web site and wherein the web application was packaged as an installable entity as instructed by a manifest included by the installable entity. In various embodiments, the web browser configured to launch the web application, manage the execution of the web application, and access from a local storage medium one or more portions of the web site associated with the web application and wherein the one or more portions of the web site were stored in the local memory when the web application was installed.

According to another general aspect, a computer-readable medium being tangibly embodied and may include executable code that causes an apparatus to execute, via a processor included by the apparatus, a web browser. The code may cause the apparatus to launch, via the web browser, the web application, wherein the web application is associated with a web site and wherein the web application was installed on the apparatus. The code may cause the apparatus to manage, by the web browser, the execution of the web application. The code may cause the apparatus to access, via the web browser, from a local storage medium one or more portions of the web site associated with the web application and wherein the one or more portions of the web site were stored in the local storage medium when the web application was installed.

The details of one or more implementations are set forth in the accompanying drawings and the description below. Other features will be apparent from the description and drawings, and from the claims.

A system and/or method for installable web applications, substantially as shown in and/or described in connection with at least one of the figures, as set forth more completely in the claims.

BRIEF DESCRIPTION OF THE DRAWINGS

FIG. 5 is a block diagram of an example embodiment of a manifest in accordance with the disclosed subject matter.

Like reference symbols in the various drawings indicate like elements.

DETAILED DESCRIPTION

Figure 1:
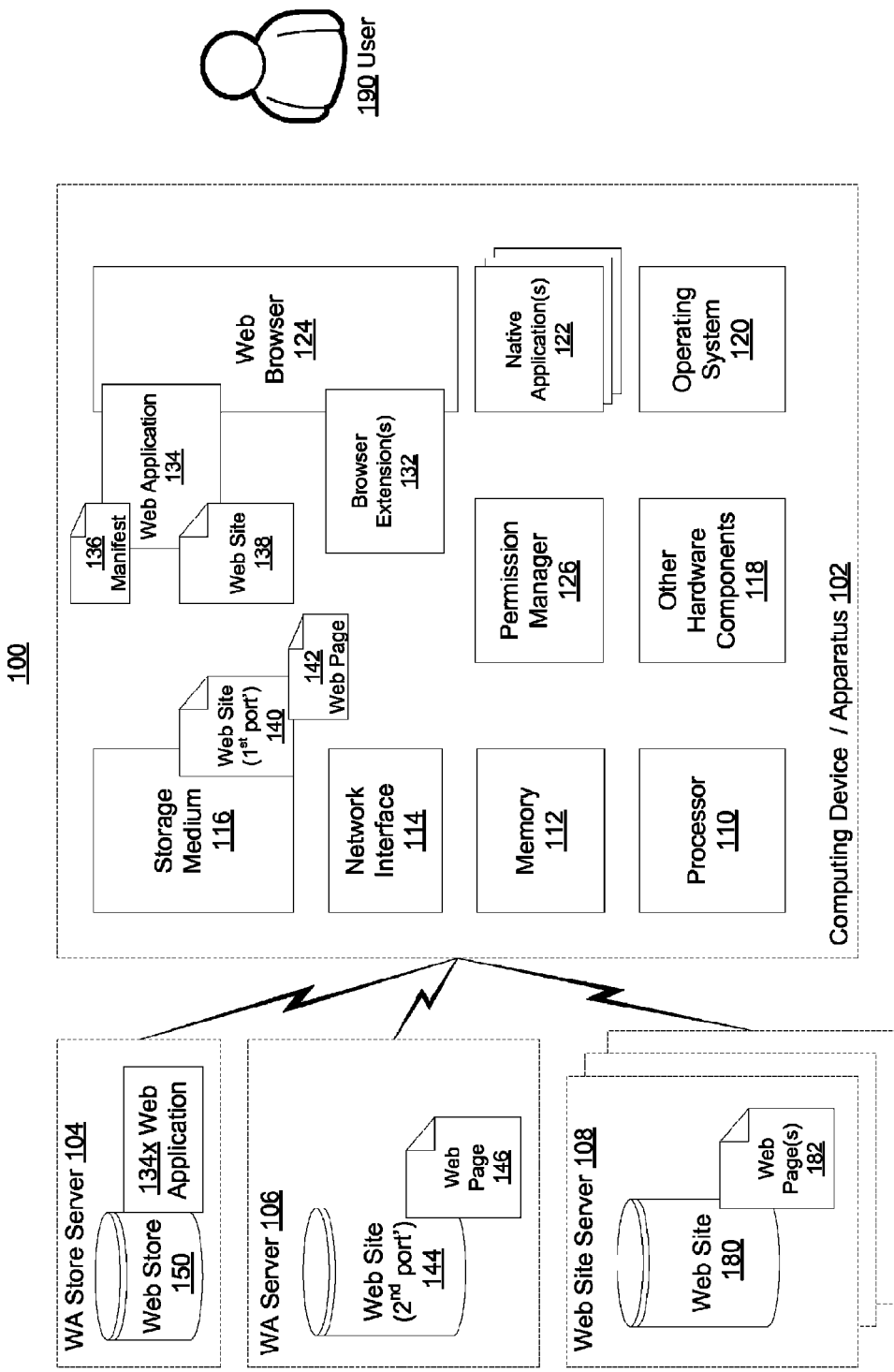
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include a computing device 102 which is used or operated by a user 190. In various embodiments, the computing device 102 may include a processor 110 configured to execute one or more machine executable instructions or pieces of software, firmware, or a combination thereof. The computing device 102 may include, in some embodiments, a memory 112 configured to store on or more pieces of data, either temporarily, permanently, semi-permanently, or a combination thereof. Further, the memory 112 may include volatile memory, non-volatile memory or a combination thereof. In some embodiments, the computing device 102 may include one or more network interfaces 114 configured to associate with and communicate via one or more communication networks (e.g., a wired network, a wireless network, a cellular network, etc.). In various embodiments, the computing device 102 may include a storage medium 116 configured to store data in a semi-permanent or substantially permanent form. In various embodiments, the storage medium 116 may be included by the memory 114. In various embodiments, the computing device 102 may include one or more other hardware components 118 (e.g., a display or monitor, a keyboard, a touchscreen, a camera, a fingerprint reader, a video processor, etc.).

In various embodiments, the computing device 102 may include an operating system (OS) 120 configured to provide one or more services to an application 112 and manage or act as an intermediary between the applications 122 and the various hardware components (e.g., the processor 110, the network interface 114, etc.) of the computing device. In such an embodiment, the computing device 102 may include one or more native applications 122, which may be installed locally (e.g., within the storage medium 116, etc.) and configured to be executed directly by the processor 110 and directly interact with the OS 120. In such an embodiment, the native applications 122 may include pre-compiled machine executable code. In some embodiments, the native applications 122 may include a script interpreter (e.g., C shell (csh), AppleScript, AutoHotKey, etc.) or a virtual machine (e.g., the Java Virtual Machine, the Microsoft Common Language Runtime, etc.) that are configured to translate source or object code into executable code which is then executed by the processor 110.

In some embodiments, the computing device 102 may include a web browser 124 configured to access a web site or a collection of web pages, scripts, etc. from a physically remote server or web server (e.g., servers 104, 106 or 108, etc.). In some embodiments, the web browser 124 may be included as one of the native applications 122 or as a portion of the operating system 120.

In various embodiments, the web browser 124 may include or be configured to interact with one or more browser extensions 132. In this context, a "browser extension 132" may include one or more web pages packaged or grouped together as a definable whole, and configured to add functionality to the web browser 124. In one embodiment, a browser extension 132 may add functionality by altering the way a web page 182 or web site 180 is displayed or rendered by the web browser 124 (e.g., by blocking advertisements, adding hyperlinks, etc.). In another embodiment, the browser extension 132 may add functionality by communicating with a server (e.g., server 108) and updating or altering the user interface (UI) of the web browser 124 (e.g., placing or changing an icon in the web browser's 124 toolbar, etc.). It is understood that the above are merely a few illustrative examples to which the disclosed subject matter is not limited.

In this context, a "web page" includes a file or document which is a portion of a web site. In various embodiments, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various embodiments, the web browser 124 may process one or more web pages in order to render one web page. For example, an HTML web page may be modified or include other web pages, such as, JavaScripts, a CSS file, various images, etc. It is understood that the above is merely one illustrative example to which the disclosed subject matter is not limited.

In this context, a "web site" may include a collection or grouping of related web pages that are generally viewable or understandable (once rendered by the web browser 124) to the user 190. In various embodiments, when a web site (e.g., web site 180) is accessed via a communications network, the web site may be accessed via the Hypertext Transfer Protocol (HTTP) or Hypertext Transfer Protocol Secure (HTTPS). It is understood that the above is merely one illustrative example to which the disclosed subject matter is not limited.

In various embodiments, the web browser 124 may include or be associated with one or more web applications 134. In this context, a "web application" may include a manifest 136 and at least a portion of a web site 138 which itself includes web pages (e.g., web page 142). In this context, a "web application" may be configured to help a user 190, via the web site 138 of the web application 134, complete a single task or multiple tasks. In such an embodiment, the web application 134 may be configured to be executed or interpreted by the web browser 124. This is compared with the native applications 122 that include machine executable code and are configured to be executed directly by the processor 110 or via the operating system 120. Whereas, a web application 134 may be incapable of execution or display without the aid of the web browser 124.

In the illustrated embodiment, the web application 124 may be packaged as an installable entity. In this context, "installation" includes the act of placing semi-permanently or substantially permanently one or more files (e.g., manifest 136, web site portion 140, etc.) on the computing device 102 for later execution or processing.

In such an embodiment, the user 190, via the web browser 124, may contact a web application store server 104 which includes or provides a web store 150. In various embodiments, the web store 150 may include one or more web applications 134x for download and installation. Each of these web applications 134x may be packaged as an installable entity in a predetermined format (e.g., Chrome Extension format (CRX), ZIP format, etc.).

In various embodiments, the user 190 may select a web application (e.g., web application 134) to download and locally install on the computing device 102. In such an embodiment, the web browser 124 may download the web application 134 and either store it locally in the packaged format, or un-package or decompress the web application into a predetermined location (e.g., a web application portion of a file system in the storage medium 116, etc.).

In one embodiment, the web application 134 may include a metadata file or manifest 136 which includes information detailing or dictating how the web browser 124 should process or manage the web application and/or what the contents of the installable web application 134 are. The manifest 134 is described in more detail in reference to FIGS. 4 and 5.

In various embodiments, the manifest file 136 may include a name and description of the web application 134. The manifest 136 may also include a URL or other identifier that, when requested by the user 190, will cause the web browser 124 to launch the web application 134 and cause the web browser 124 to access or execute the web site 138 included by the web application 134. For example, the web application's manifest 136 may indicate that whenever a user 190 seeks to access the web site http://www.npr.org the web application 134 is to be invoked and executed via the web browser 124, instead of accessing the remote server traditionally pointed to by the URL http://www.npr.org (e.g., web site server 108, etc.). In such an embodiment, the web site owner may provide a first experience or web site 180 to users accessing the site with a plain, traditional, or un-enhanced web browser without the web application 134 (not shown), and a second experience or web site 138 to users accessing the site with an enhanced web browser 124 that has the respective web application 134 installed.

In various embodiments, when executing the web application 134 the web browser 124 may render the included web site 138 differently than a web site 180 stored on or accessed outside the web application 134. For example, in one embodiment, the web browser 124 may be configured to not display one or more web pages 142 of the web application 134. In such an embodiment, these web pages 142 may be considered part of a background web page 142 or web site 138. In another embodiment, the web browser 124 may allow a web application 134 to reside or be displayed in the user interface (e.g., as an icon in a toolbar, etc.) of the web browser 124. In general, the web browser 124 may allow the web application 134 to more tightly integrate with the web browser 124. It is understood that the above are merely a few illustrative examples to which the disclosed subject matter is not limited.

In one embodiment, the web browser 124 may allow the web application 134 access to permissions or functionality not normally provided to a remote web site 180. In such an embodiment, the computing device 102 may include a permissions manager 126 configured to manage user 190 allowed permissions for various functionality features (e.g., access to the storage medium 116, access to a camera, access to a location sensor, the ability to issue pop-up notifications to the user 190, etc.) of the computing device 102. In such an embodiment, a web application 134 may indicate (e.g., via the manifest 136) that the web application 134 may require or would desire permission to utilize one or more features associated with the computing device 102. In various embodiments, these features may include accessing information provided by one or more components or system resources (e.g., a camera, storage space, network bandwidth, location, etc.) of the computing device 102. It is understood that the above is merely one illustrative example to which the disclosed subject matter is not limited.

In one embodiment, when the web application 134 is installed, the user 190 may be asked to grant or deny the web application 134 permission to access these one or more system resources. In various embodiments, if the user 190 does not grant access to the requested system resources, the installation of the web application 134 may fail. In another embodiment, the web application 134 may request access for required and/or desired permissions. In such an embodiment, the web application 134 installation may successfully complete even if some of the desired permissions where not granted.

In various embodiments, the web browser 124 or permission manager 126 may maintain a list of the granted or denied permissions and their association with the respective web applications (for systems including more than one web application 134). In such an embodiment, the web application 134 or web browser 124 may not need to re-ask the user 190 for permissions every time the web application 134 is executed. In various embodiments, each time the web application 134 is executed or accessed the permissions manager 126 may grant or deny access to the system resources based upon the user 190's previous indications. In some embodiments, as the web application 134 is re-installed or updated the grant or denial of permissions may be re-asked and re-granted or denied. In yet another embodiment, the permissions manager 126 may include a means by which the user 190 may change or alter the set permissions as the user 190 wishes without needing to reinstall the web application 134.

As described above, in various embodiments, the web application 134 may include or be associated with a web site 138. In one embodiment, the entire web site 138 may be included by or packaged with the web application 134. In another embodiment, only a first portion 140 of the web site 138 may be included by or packaged with the web application 134.

Figure 2:
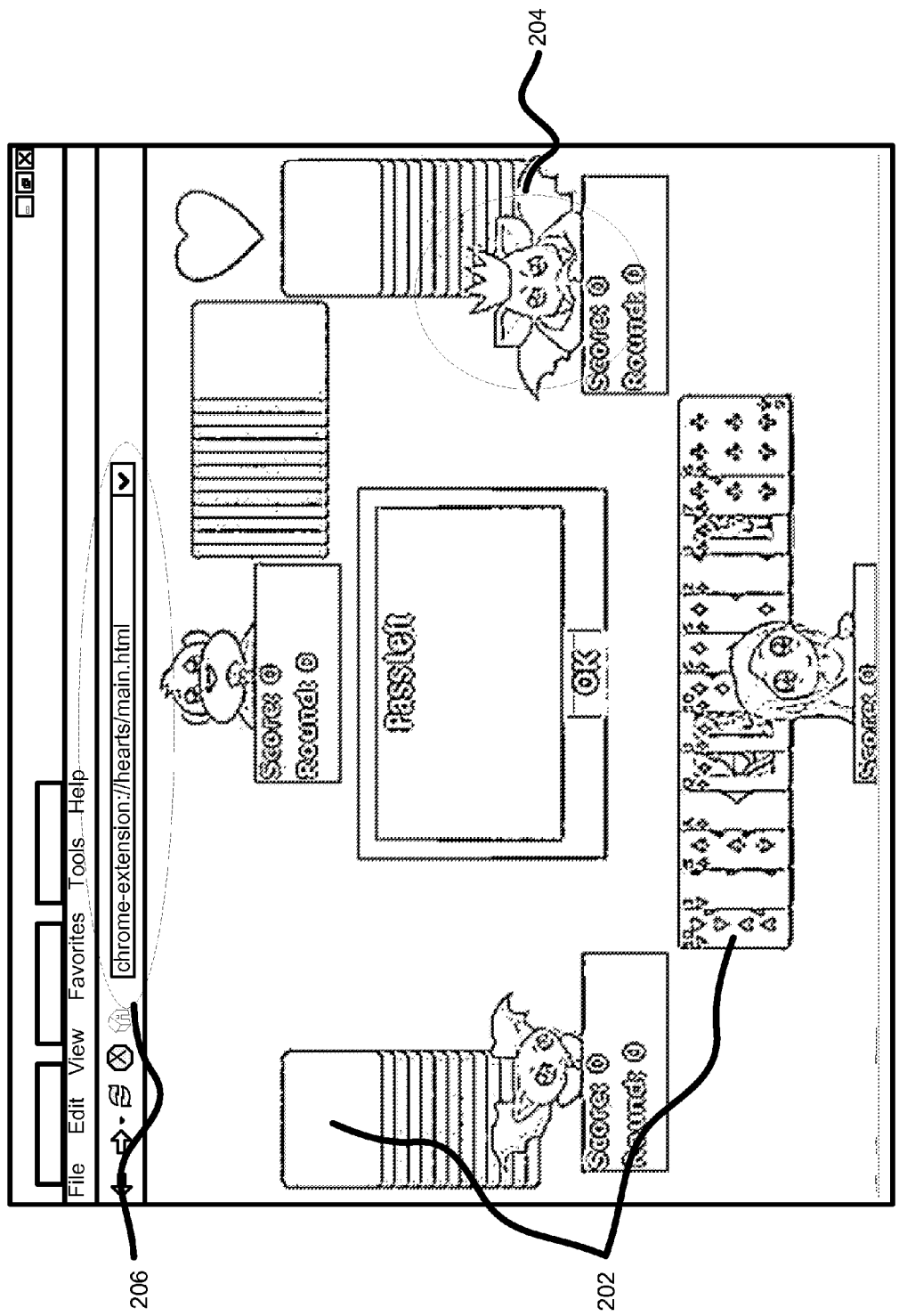
FIG. 2 is a block diagram of an example embodiment of a web application in accordance with the disclosed subject matter.

The embodiment in which entire web site 138 is packaged with the web application 134 and installed locally to the computing device 102 will be described first. FIG. 2 is a block diagram of an example embodiment of a web application 200 in accordance with the disclosed subject matter, and may be referred to as is useful in illustrating the above embodiment.

In the locally installed embodiment, during installation of the web application 134, the web site 138 may be installed, saved or stored in the storage medium 116. As described above, this web site 138 may include one or more web pages 142. These web pages 142 may be stored locally on the storage medium 116.

A user 190 may wish to use an installed web application 134. In order to use the web application 134, the user 190 may start the web application 134. For example, the user 190 may select the web application 134 from a list or web page generated by the web browser 124 listing the web applications 134 that are currently installed. Alternatively, in another embodiment, the user 190 may navigate to a URL or web location associated with the web application 134 (e.g., http://www.npr.org, etc.). In yet another embodiment, if the web application 134 is substantially self-contained, the user 190 may enter a specific URL that indicates that the web application 134 is locally stored and should be run or executed (e.g., chrome-extension://hearts/main.html, etc.). In various embodiments, the URL used to manually launch the web application 134 may also be used in the embodiment in which the web browser 124 generates a list of installed web application 134. It is understood that the above are merely a few illustrative examples to which the disclosed subject matter is not limited.

In the current embodiment, the web application 134 may be substantially self-contained and may not require or store portions of its web site 138 externally or remotely from the computing device 102. In such an embodiment, the web site 138 may be stored in its entirety in the storage medium 116, although in various embodiments, various web pages 142 may be dynamically generated. In such an embodiment, the web application 134 may be configured to be used or launch in an offline mode in which the computing device 102 does have access to or make use of a communications network (e.g., such as that used by network interface 114, etc.).

In such an embodiment, as the user 190 accesses the web application 134, the web browser 124 may manage the execution of the web application 134. In various embodiments, this management may include processing and rendering various web pages 142 that are included in the web site 138. In various embodiments, executing the web application 134 may include executing one or more scripts (e.g., JavaScript files, etc.) or web pages 142 by the web browser 124. In some embodiments, these scripts may dynamically alter or generate a web page 142 (e.g., an HTML page, a page that employs Asynchronous JavaScript and XML (AJAX), etc.). In one more embodiment, the management of the execution by the web browser 124 may include collecting and forwarding UI events (e.g., key presses, mouse clicks, etc.) and providing them to the web application 134, or executing scripts based upon those UI events. It is understood that the above are merely a few illustrative examples to which the disclosed subject matter is not limited.

In this context, a script that is executed locally by the computing device 102 is referred to as a "client-side script". Conversely, a script that is executed remotely from the computing device 102, for example by a web server such as servers 106 or 108, is referred to a "server-side script".

In the present embodiment, during the execution of the web application 134 one or more of the locally stored web pages 142 may be accessed by the web browser 124. These web pages 142, depending upon their type (e.g., HTML, JavaScript, etc.) may be rendered and displayed to the user 190 or otherwise processed by the web browser 124.

As described above, FIG. 2 is a block diagram of an example embodiment of a web application 200 in accordance with the disclosed subject matter. In such an embodiment, the web application 200 may include one or more image web pages that may be stored locally to the web application or the computing device. Such local storage may alleviate or reduce the need for network communication in order to run or execute the web application 200. Also, such local storage may alleviate the need to acquire and manage internet hosting services, saving the developer time and money. It is understood that the above are merely a few illustrative examples to which the disclosed subject matter is not limited.

Web application 200 shows a simple video game, specifically video game for playing the card game Hearts. In the illustrated embodiment, the Hearts web application 200 may be a self-contained web application, in that it does not require communication with another computing device (e.g., a server, etc.) in order to function. In such an embodiment, a self-contained web application may be contrasted with other forms of web applications such as HTML5's Application Cache that requires a user to access an online web site, even if the user only goes to or accesses the online web site only for an initial setup. It is understood that the above is merely one illustrative example to which the disclosed subject matter is not limited.

Figure 3:
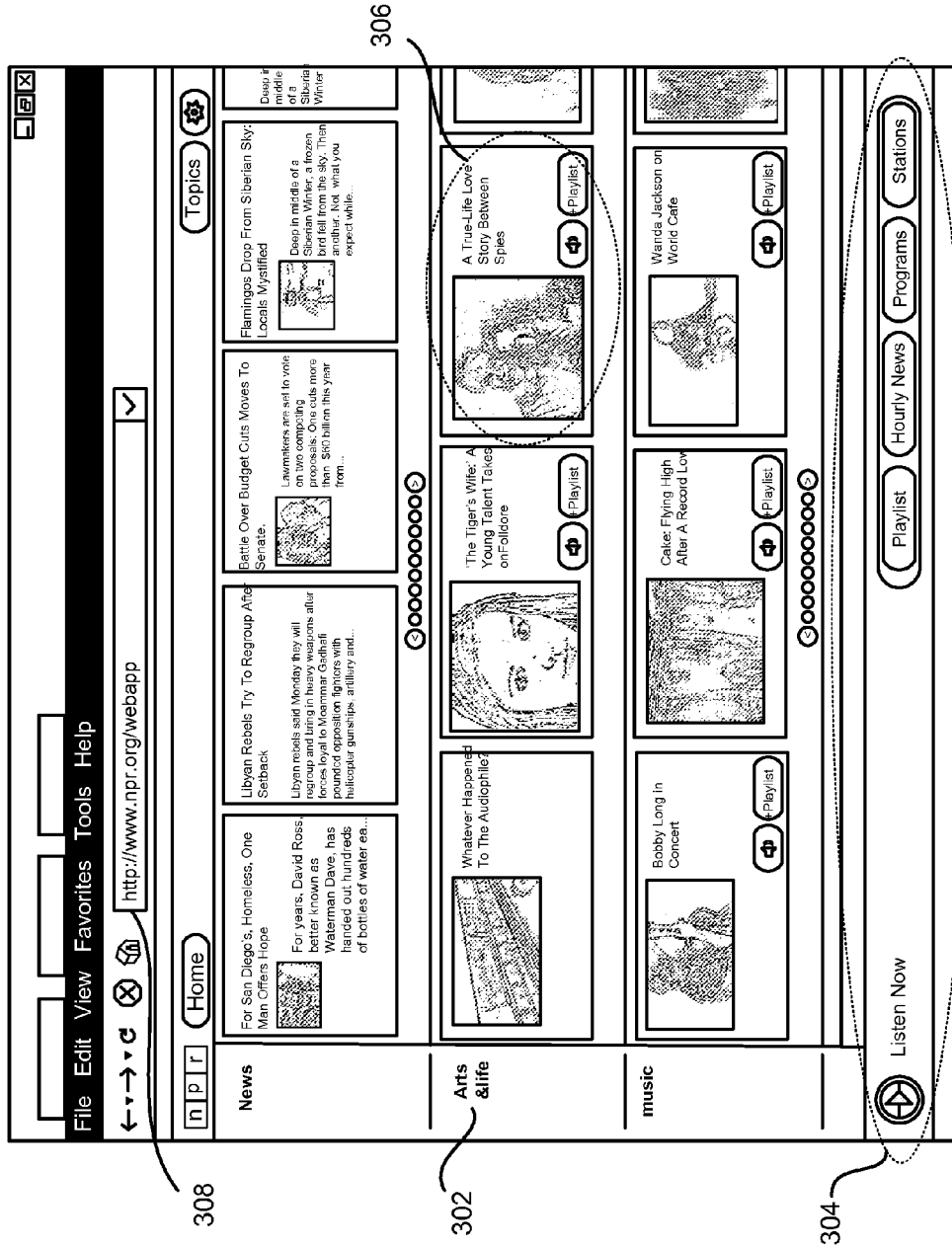
FIG. 3 is a block diagram of an example embodiment of a wen application in accordance with the disclosed subject matter.

It is understood that FIG. 2 and FIG. 3 merely provide a few illustrative examples of the disclosed subject matter and as such show hypothetical user interfaces for their respective web applications 200 and 300. It should not be construed that the disclosed subject matter asserts how any one actual web application may actually be implemented, merely how it is possible, given the disclosed subject matter, to implement the illustrated web applications. It is understood that the disclosed subject matter is not limited to the actual implementation of particular web application that may bear similarities to the illustrative example embodiments shown herein.

In such an embodiment, the web application 200 may include various web pages as part of the web application 200's included web site. Such web pages may include the images of playing cards 202 and other images or graphics for the video game. Further, the web site may include one or more scripts which control the artificial intelligence (AI) or actions of any computer players 204. These web pages may be locally stored within the computing device during the installation of the web application 200.

In such an embodiment, the web browser, when executing the web application, may access or retrieve these locally stored web pages from the local storage medium. In the case of the images 202 the images may be accessed from the local storage medium and displayed or rendered by the web browser. In the case of the computer player AI scripts, the web browser may access the client-side scripts and execute them. The execution of these AI scripts may result in the alteration and re-rendering by the web browser of the main web page of the web application that defines the playing field (e.g., the table at which the game of Hearts is played, etc.).

In one embodiment, the web application 200 is a local web application 200 in that it only needs to access web pages or a web site which is locally stored, may be accessed by a special URL. As described below in reference to FIG. 4, this URL or launch attribute may be specified in the manifest. The URL 202 (e.g., chrome-extension://hearts/main.html) illustrates how, in one embodiment, the local web application 200 may be accessed by the web browser. As described above, this URL 202 may be manually entered by a user or linked to from a list of installed web applications or another linking mechanism.

In one embodiment, the URL 202 may include a protocol portion that indicates that the web page or web site is located locally to the computing device and stored within a local storage medium. In various embodiments, the computing device may maintain a defined portion of the file system for locally stored web applications, this protocol portion (e.g., chrome-extension://, etc.) may indicate to the web browser that the web page is located within that portion of the file system.

The URL 202, in one embodiment, may include a web application identification (ID) portion (e.g., hearts, etc.) that indicates which web application or other web browser add-on (e.g., a browser extension, browser plug-in, etc.) is to be accessed or executed. In some embodiments, a human readable name (e.g., hearts) may be translated into a computer readable identifier (e.g., "aghebnklidaaa", "04:d3:a9:9b:de: ad:be:ef", etc.). For example, in one embodiment, the web applications may each be identified with a substantially universally unique identifier (UUID). In one embodiment, the UUID may include a portion of the public key hash associated with the web application. In such an embodiment, the web browser may translate or map this human readable identifier (e.g., "hearts", etc.) to the UUID to access or determine where in the local file system the web application's web site is stored.

In one embodiment, the URL 202 may include a portion (e.g., main.html) that indicates exactly which web page of the web application's web site is to be accessed and displayed to the user. In various embodiments, the web page may refer or link to other web pages within the web application's web site (e.g., images, computer player AI scripts, etc.). In such an embodiment, the link to these web pages may be relative or assume that the first two portions of the URL 202 (protocol and web application UUID) are to assumed or added by the web browser, as is done with traditional Internet web pages. It is understood that the above are merely a few illustrative examples to which the disclosed subject matter is not limited.

In the illustrated embodiment, the web application 200 includes a self-contained web site. In such an embodiment, the web browser may only access locally storage web pages or files of the web site. As described above, this may allow the web application to be used in an offline mode, in which network communication is not required.

In another embodiment, which may also be illustrated by FIG. 2, the web application 200 may include both a self-contained web site and portions which allow for the on-line use of the web application. For example, if the player or user wishes to only play Hearts against a computer player the web application 200 may not need to access web pages or other data over a communications network, and therefore be substantially self-contained. However, if a user wishes to play Hearts against another human being, operating on another computing device, the web application 200 may be configured to contact a remote server or another computing device to communicate with another user or player.

Returning to FIG. 1, in various embodiments, while the web site 138 may be locally stored in storage medium 116, the web application 134 may transmit or communicate relatively simple messages (e.g., player moves, the network addresses of other players, etc.) across a communications network via the network interface 114. In various embodiments, these messages may be to another user's computing device (not shown, but analogous to computing device 102) or a server associated with the web application 134 (e.g., web application server 106). In various embodiments, the web application 134 may utilize a third party server (e.g., web site server 108, an instant messaging server, etc.) to coordinate communication between multiple instances of the web application 134 being executed on different respective computing devices (e.g., each player's or user's respective computing device, etc.). In another example embodiment, a web application 134 for editing documents, images, or videos may be configured to allow editing and saving locally to the storage medium 116 when in an offline mode, but may also allow the saving of the documents, images, and videos to an remote server if the computing device 102 is in communication with the remote server (an online mode), etc. It is understood that the above are merely a few illustrative examples to which the disclosed subject matter is not limited.

While the illustrated embodiment described above, details a video game web application, it is understood that the above is merely one illustrative example to which the disclosed subject matter is not limited. Other examples of local web applications could include spreadsheets, word processors, photo editors, music or media players, etc. It is understood that the above are merely a few illustrative examples to which the disclosed subject matter is not limited.

In another embodiment, the web application 134 may include the web site 138; however, the web site 138 may be stored in at least two portions. A first or local portion 140 may be locally stored on the storage medium 116. A second or remote portion 144 may be remotely stored on a server 106 or other computing device which is accessible via a communications network. In some embodiments, the web application 134 may be referred to as a "hybrid web application".

In various embodiments, some hybrid web applications 134 may be configured to work in either an offline or an online mode. In such an embodiment, the web application 134 may include a self-contained web site 138, but may also be configured to utilize resources provided by an external or remote web service (e.g., web application server 106, etc.) if such a web service is available. In such an embodiment, if the web application 138 detects or if able to communicate with the external or remote resource additional features or functionality of the web application 134 may be enabled.

For example, a complex video game web application 134 (e.g., a first person shooter (FPS) combat game, a strategy game, etc.) may allow the user 190 to play offline in a single player mode, but may also provide additional game levels or playing fields, an achievement system, a multi-player mode, a social networking component, etc. if the user 190 decides to play the video game web application 134 in an on-line mode. In such an embodiment, the hybrid web application 134 may include additional content or scripting functionality (e.g., web page 146) that is provided by a second portion of the web site 144 that is stored remotely (e.g., on the web application server 106, etc.).

In another embodiment, an email web application 134 may read and receive emails, and synchronize email messages and locally store them during an online mode, but allow the reading and editing (but not the sending or receiving) of email message in an offline mode. It is understood that the above are merely a few illustrative examples to which the disclosed subject matter is not limited.

In such an embodiment, during the installation process of the web application 134, the first portion 140 of the included web site 138 may be stored locally within the storage medium 116. The manifest 136 may include an indication or field that indicates what portion 140 is stored locally and what portion 144 is stored remotely. In another embodiment, the portion 144 is stored remotely may be inferred as any portion that is not stored locally. In various embodiments, these portions may be indicated by a URL or a file system or directory portion. For example, the filed "local-url: /ui" may indicate that web pages stored in the "ui" directory of the web site and any files underneath that directory are stored locally. In another embodiment, the portion may be indicated via other means (e.g., web page type, web page size, etc.). In yet another embodiment, the web application 134 may be configured to attempt to access a desired web page from the local storage medium first, and if the desired web page is not found locally, attempt to access the desired web page from a remote location (e.g., web application server 106). It is understood that the above are merely a few illustrative examples to which the disclosed subject matter is not limited.

In such an embodiment, when the web application 134 attempts to access a web page or a portion of the web site 138, the web browser 124 may determine whether or not the web page is stored locally or remotely. If the web page is stored locally (e.g., web page 142, etc.) in the local portion of the web site 140, the web browser 124 may access the web page 142 from the local storage medium 116. Conversely, if the desired web page is stored remotely (e.g., web page 146) as part of the remote portion 144, the web browser 124 may access the web page 146 via the communications network.

The division between the local portion 140 and the remote portion 144 of the web site 138 may be made based upon various criteria or no systematic criteria at all. In one embodiment, the local portion 140 of the web site 138 may include web pages 142 that are relatively static or do not frequently change (e.g., logo images, button images, user interface scripts and HTML, etc.) or include client-side scripts or processing. Conversely, the remote portion 144 may include web pages 146 that are relatively dynamic or frequently changing (e.g., news articles, information retrieved from a database, a map, etc.) or include server-side scripts or processing. Other criteria may include the size of the web pages (in which larger files are stored remotely), the ownership of the web pages (e.g., the web application 134 may rely upon third-party data, etc.), or other criteria. It is understood that the above are merely a few illustrative examples to which the disclosed subject matter is not limited.

As described above, FIG. 3 is a block diagram of an example embodiment of a web application 300 in accordance with the disclosed subject matter. In such an embodiment, the web application 300 may include one or more image web pages that may be stored both locally and remotely to the computing device.

Web application 300 shows a news web site, specifically hypothetical web site for National Public Radio (NPR). In the illustrated embodiment, the NPR web application 300 may be a hybrid web application, in that it includes both a locally stored portion and a remote portion that is retrieved or accessed from a remote server. It is understood that the above is merely one illustrative example to which the disclosed subject matter is not limited.

It is understood that FIG. 2 and FIG. 3 merely provide a few illustrative examples of the disclosed subject matter and as such show hypothetical user interfaces for their respective web applications 200 and 300. It should not be construed that the disclosed subject matter asserts how any one actual web application (e.g., NPR's actual web application) may actually be implemented, merely how it is possible, given the disclosed subject matter, to implement the illustrated web applications. It is understood that the disclosed subject matter is not limited to the actual implementation of particular web application that may bear similarities to the illustrative example embodiments shown herein.

In one embodiment, the web application 300 may include locally stored elements or web pages (e.g., buttons, UI scripts or elements, etc.) such as the images and graphics 302 or the user interface elements (e.g., button images, etc.) and scripts 304. In such an embodiment, the web application 300 may be able to quickly and efficiently provide a skeletal version of the web application's web site by only accessing locally stored web pages (e.g., web pages 302 and 304).

In such an embodiment, the web application 300 may also include remotely stored elements or web pages (e.g., images, audio, or video, etc.) retrieved or accessed from a remote web application server. In the illustrated embodiment, these remote web pages 306 may include the news stories, their related graphics or images, and any text, audio, or video web page elements associated with the stories. In such an embodiment, the web application 300 may populate the user interface with current or dynamic web page elements. The web application 300, or more accurately the web browser executing the web application 300, may retrieve these web pages 306 when the web application 300 is executed thus allowing the news stories provided by the web application 300 to be current and dynamically changing.

In various embodiments, the hybrid web application 300 may be accessed via a URL 308 entered or employed by the web browser. As described below in reference to FIG. 5, the web application 300 may be associated with an origin domain or URL portion. When accessing this origin domain or URL portion, the web browser may automatically invoke the web application 300.

Returning to FIG. 1, in some embodiments, the web application 134 may allow for the local storage of one or more of these remote web pages 146. In such an embodiment, the web application 134 may alter or dynamically change the portion of the provided web site which is stored locally (portion 140) versus stored remotely (portion 144). In one embodiment, a remote web page 146 may be moved or copied from the remotely stored portion 144 of the web site 138 to the locally stored portion 140.

For example in the context of the example of the NPR news web site, a user 190 or the web browser 124 may download and store locally a number of stories and their audio and video content, and then access these now locally stored web pages or portions of the web site in an offline mode. In another embodiment, such a technique of locally storing portions of the web site provided by the web application 300 may for video streaming or rental web applications, music services, eBook or audiobook services, etc. It is understood that the above are merely a few illustrative examples to which the disclosed subject matter is not limited.

In one embodiment, when the web application 134 is updated, a new version of the web application 134 may be downloaded or retrieved from the web application store server 104. This new version of the web application 134 may be installed upon the computing device 102. In some embodiments, this may include uninstalling the previous version of the web application 134. In another embodiment, this may include patching or over-writing at least a portion of the previous version of the web application 134 with new portions of the updated web application 134. During this updating or upgrading process, one or more portions of the web site 138 that are stored locally (e.g., local portion 140) may be automatically updated or over-written. Likewise, during the updating or upgrade process the manifest 136 may be altered or updated.

Figure 4:
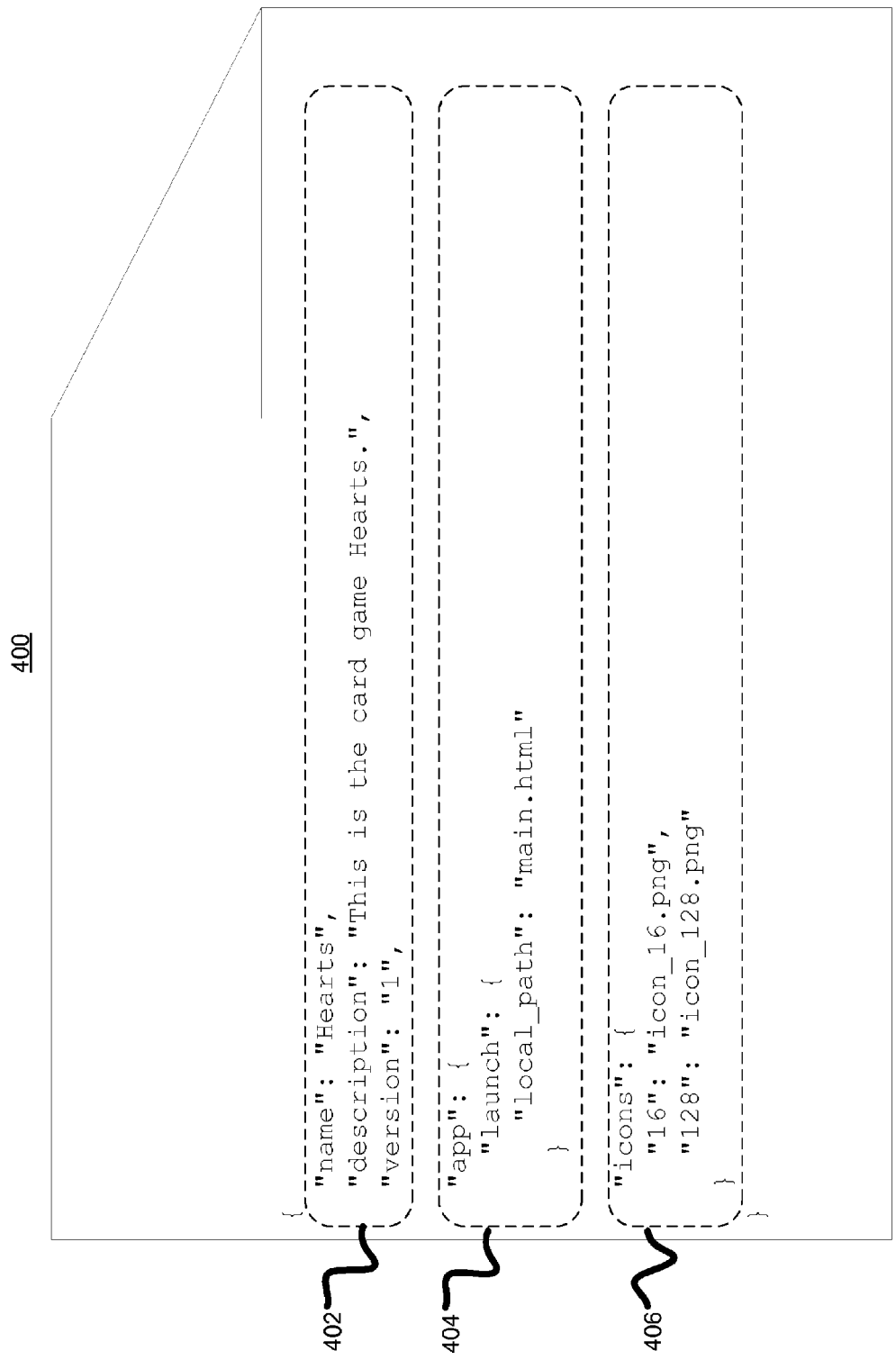
FIG. 4 is a block diagram of an example embodiment of a manifest in accordance with the disclosed subject matter.

FIG. 4 is a block diagram of an example embodiment of a manifest 400 in accordance with the disclosed subject matter. In one embodiment, the manifest 400 may include a plurality of portions or fields. Each field or portion may dictate how the web browser is to manage or execute the associated web application.

In one embodiment, the manifest 400 may include a name or identification portion 402 that indicates one or more of a human readable name (e.g., "Hearts", etc.), a description of the web application, a version identifier (e.g., "1", "1.3", etc.), and a substantially unique identifier (ID) (not shown). As described above, the substantially unique ID may include or be based upon a cryptographic hash of a public key or a portion thereof.

In various embodiments, the manifest 400 may include a launch portion 404 that indicates when the web browser should launch or begin executing the web application. In one embodiment, the launch portion 404 may include a URL or a portion thereof (e.g., main.html, etc.) that, when accessed by the web browser, causes the web browser to begin executing the web application. In the illustrated embodiment, if a full URL is not specified, one or more portions of the URL may be implied. For example, in the illustrated embodiment, the launch portion 404 may indicate only a web page (e.g., main.html). The web browser may assume that the rest of the URL includes a predetermined or deterministic pattern. For example, the protocol portion of the URL may include a web application specific protocol (e.g., chrome-extension://, web-app://, etc.). In some embodiments, the domain portion of the URL may include the web application's name (e.g., hearts, etc.) or unique ID (e.g., 18745289, etc.). It is understood that the above are merely a few illustrative examples to which the disclosed subject matter is not limited.

In such an embodiment, if the web application's manifest only includes a local launch portion 404, the web application may be assumed to be locally stored. In various embodiments, the web application's web site may be stored locally based on a predetermined or deterministic technique in a portion of the local file system dedicated to web applications and partitioned or segregated by web application. In various embodiments, the web application may include a self-contained web site.

In one embodiment, the manifest 400 may also include one or more other portions 406 that specifically other pieces of information related to the web application. In the illustrated embodiment, portion 406 may include information detailing the icon to display for the web application. It is understood that the above are merely a few illustrative examples to which the disclosed subject matter is not limited.

FIG. 5 is a block diagram of an example embodiment of a manifest 500 in accordance with the disclosed subject matter. In one embodiment, the manifest 400 may include a plurality of portions or fields. Each field or portion may dictate how the web browser is to manage or execute the associated web application.

In one embodiment, the manifest 500 may include a name or identification portion 502 that indicates one or more of a human readable name (e.g., "NPR", etc.), a description of the web application, a version identifier (e.g., "1", "1.3", etc.), and a substantially unique identifier (ID) (not shown). As described above, the substantially unique ID may include or be based upon a cryptographic hash of a public key or a portion thereof.

In one embodiment, the manifest 500 may include a web-extent or origin domain(s) portion 504. In various embodiments, the web-extent or origin domain(s) portion 504 may indicate the web extent associated with the web application. As described herein, a "web extent" may be used to define a web space (e.g., Uniform Resource Locator (URL) space, etc.) where web content (e.g., web pages, etc.) for use with a given web-based application is located. Content that is available in the specified web space may be referred to as being within the web extent of the particular web-based application.

The web-extent or origin domain(s) portion 504 may further indicate one or more origins of the web application. In this context, an "origin" includes a URL, URL portion, or domain name from which web content or web pages may be accessed. For example, if the origin field or value is "http://www.npr.org" data or web content accessed from that domain or URL portion may be considered part of the web application and granted the permissions (or lack thereof) of the web application. Further, in some embodiments, the origin field may include one or more paths or URL portions (e.g., webapp/, etc.) that may be added to the domain portion when determining if web content is part of the web application. In such an embodiment, web application content and non-web application content may be stored using the same domain name (e.g., www.npr.org) but separated by different directories within that domain (e.g., webapp/ vs. sections/arts/, etc.). It is understood that the above is merely one illustrative example to which the disclosed subject matter is not limited.

In one embodiment, the manifest 500 may include a launch portion 506. As described above, the launch portion 506 may indicate when the web browser should launch or begin executing the web application. In one embodiment, the launch portion 506 may indicate which portions of the web application's web site are stored locally (e.g., via a "local-url" identifier, etc.) and which portions are stored remotely (e.g., via a "web-url" identifier, etc.). In such an embodiment, the local versus remotely stored identifiers or fields may include portions of a URL (e.g., /ui, /videos, etc.). It is understood that the above are merely a few illustrative examples to which the disclosed subject matter is not limited.

In various embodiments, the manifest 500 may include a permissions portion 508 that indicates what permissions the web application requires or desires. In various embodiments, the manifest 500 may indicate both which system resource permissions are required by the web application and what system resource permissions are optional. However, in the illustrated embodiment, only required system permissions are shown (e.g., a need for unlimited local storage, a need to issue asynchronous notifications to the user, etc.). As described above, in various embodiments, during installation the web browser or other means may ask the user to grant or deny the web application the permissions listed in the permission portion 508 of the manifest 500. It is understood that the above are merely a few illustrative examples to which the disclosed subject matter is not limited.

In some embodiments, the manifest 500 may include may also include one or more other portions 510 that specifically other pieces of information related to the web application. In the illustrated embodiment, portion 510 may include information detailing the icon to display for the web application. It is understood that the above are merely a few illustrative examples to which the disclosed subject matter is not limited.

Figure 6:
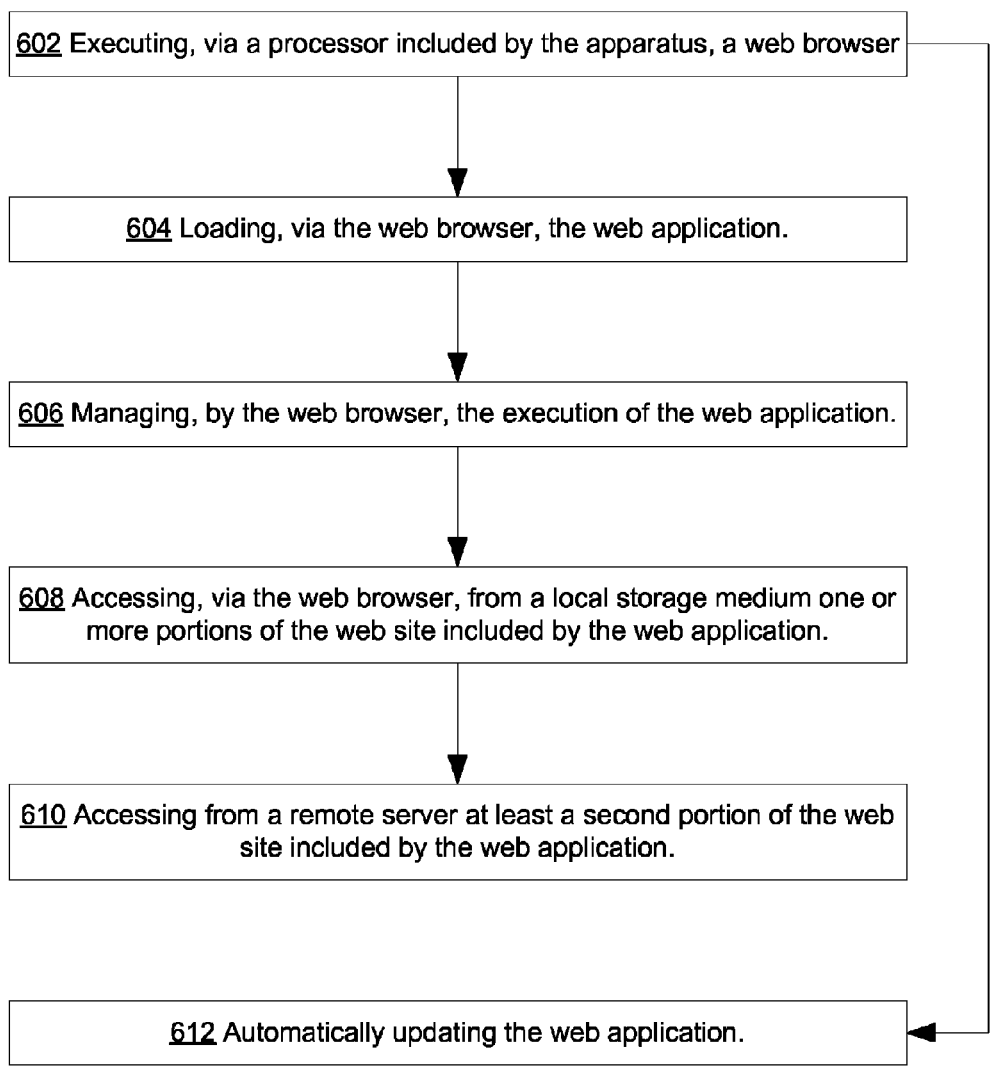
FIG. 6 is a flow chart of an example embodiment of a technique in accordance with the disclosed subject matter.

FIG. 6 is a flow chart of an example embodiment of a technique 600 in accordance with the disclosed subject matter. In various embodiments, the technique 600 may be used or produced by the systems such as those of FIG. 1 or 7. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, processor may execute a web browser, as described above. As described above, in various embodiments, the web browser may be included as part of an operating system. In some embodiments, the web browser may be a native application that includes machine executable code and is executed with the aid of the operating system. In various embodiments, one or more of the action(s) illustrated by this Block may be performed by the apparatuses or systems of FIG. 1 or 7, the processor 110 or web browser 124 of FIG. 1, as described above.

Block 604 illustrates that, in one embodiment, the web browser may load or launch the web application, as described above. In various embodiments, the web application may include manifest and at least a portion of a web site, as described above. In some embodiments, the web application may have been previously packaged as an installable entity and installed on to the computing device that includes the web browser, as described above. In one embodiment, the web application may include a self-contained web site, as described above. In another embodiment, the web application may include a locally stored portion of the web site and a remotely stored portion of the web site, as described above.

In such an embodiment, the web application may include a first portion of the web site that is locally stored and includes static web pages and client-side executable code that is executed by the apparatus, as described above. In various embodiments, the web application may also include a second portion of the web site that is remotely stored and includes dynamically changing web pages and server-side executable code, as described above.

In one embodiment, the web application may include a manifest or metadata file that includes a local storage field indicating which portion of the web site is stored in the local storage medium, as described above. In some embodiments, the local storage field may indicate that any portions of the web site identified by at least a first portion of a universal resource locator (URL) are stored in the local storage medium, as described above. In various embodiments, one or more of the action(s) illustrated by this Block may be performed by the apparatuses or systems of FIG. 1 or 7, the web application 134, the manifest 136, the web site 138, server 106 of FIG. 1, as described above.

Block 806 illustrates that, in one embodiment, the web browser may manage the execution of the web application, as described above. In one embodiment, managing may include acquiring one or more permissions to access one or more system resources from a user of the apparatus, as described above. In some embodiments, managing may also include granting or denying the permissions to access the system resources to portions of the web application regardless of whether the portion of the web application is stored locally or remotely, as described above.

In some embodiments, managing may include receiving a request from a user to access a requested portion of the web site included by the web application, as described above. In various embodiments, managing may include determining if the requested portion of the web site was stored locally when the web application was installed, as described above. In such an embodiment, if the requested portion of the web site was stored locally when the web application was installed, causing the requested portion to be accessed from a local storage medium, as described above. In such an embodiment, if the requested portion of the web site was not stored locally when the web application was installed, causing the requested portion to be accessed from a remote server, as described above. In various embodiments, one or more of the action(s) illustrated by this Block may be performed by the apparatuses or systems of FIG. 1 or 7, the web application 134, the manifest 136, the web site 138, server 106 of FIG. 1, as described above.

Block 808 illustrates that, in one embodiment, the web browser may access from a local storage medium one or more portions of the web site included by the web application, as described above. In various embodiments, the one or more portions of the web site were stored in the local storage medium when the web application was installed, as described above. In some embodiments, accessing may include accessing from a local storage medium a first portion of the web site, as described above. In various embodiments, one or more of the action(s) illustrated by this Block may be performed by the apparatuses or systems of FIG. 1 or 7, the web application 134, the manifest 136, the web site 138, storage medium 116 of FIG. 1, as described above.

Block 810 illustrates that, in one embodiment, the web browser may access from a remote storage medium one or more portions of the web site included by the web application, as described above. In various embodiments, the one or more portions of the web site may have been stored in the remote storage medium after the web application was installed, as described above. In some embodiments, accessing may include accessing from a remote server or storage medium a second portion of the web site, as described above. In various embodiments, one or more of the action(s) illustrated by this Block may be performed by the apparatuses or systems of FIG. 1 or 7, the web application 134, the manifest 136, the web site 138, server 106 of FIG. 1, as described above.

Block 812 illustrates that, in one embodiment, the web browser may automatically update the web application, as described above. In various embodiments, this updating may occur without any user interaction. In another embodiment, the user may be asked to grant or deny various permissions to sue system resources to the web application, as described above. In various embodiments, automatically updating the web application may include automatically updating the one or more portions of the web site stored in the local storage medium, as described above. In various embodiments, one or more of the action(s) illustrated by this Block may be performed by the apparatuses or systems of FIG. 1 or 7, the web application 134, the manifest 136, the web site 138, server 104 of FIG. 1, as described above.

Figure 7:
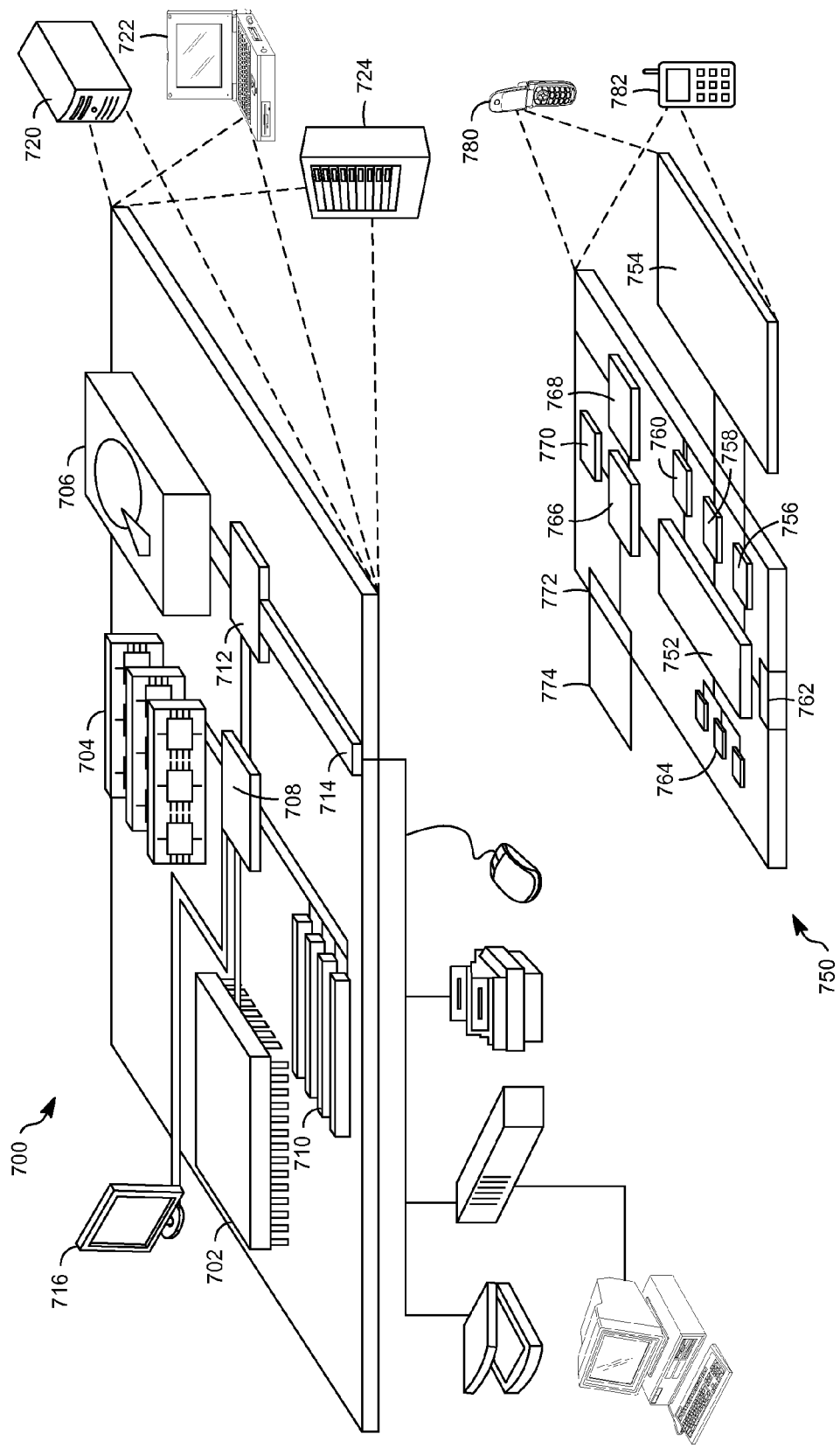
FIG. 7 is a block diagram of an example embodiment of a system in accordance with the disclosed subject matter.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of executing a web application installed on an apparatus, the method comprising:
    executing, via a processor included by the apparatus, a web browser;
    loading, via the web browser, the web application, wherein the web application includes a manifest and at least a portion of a web site, wherein the web application was packaged as an installable entity and the web site is self-contained;
    managing, by the web browser, the execution of the web application; and
    accessing, via the web browser, from a local storage medium one or more portions of the web site included by the web application and wherein the one or more portions of the web site were stored in the local storage medium when the web application was installed, wherein accessing from the local storage medium the one or more portions of the web site includes never accessing any portion of the web site from a remote server, and only accessing the one or more portions of the web site from the local storage medium.

2. The method of claim 1, wherein the web application includes a video game.

3. The method of claim 1, wherein the manifest includes a local storage field indicating which portion of the web site is stored in the local storage medium.

4. The method of claim 3, wherein the local storage field indicates that any portions of the web site identified by at least a first portion of a universal resource locator (URL) are stored in the local storage medium.

5. The method of claim 1, further comprising:
    automatically updating the web application, wherein automatically updating the web application includes automatically updating the one or more portions of the web site stored in the local storage medium.

6. The method of claim 1, wherein the web application includes a first portion of the web site that is locally stored and includes static web pages and client-side executable code that is executed by the apparatus.

7. An apparatus comprising:
    a processor configured to execute executable code defining a web browser;
    a local memory configured to store at least a portion of a web site associated with a web application;
    the web application comprising at least a portion of a web site, wherein the web application was packaged as an installable entity as instructed by a manifest included by the installable entity and the web site is self-contained; and
    the web browser configured to:
        load the web application;
        manage the execution of the web application; and
        access from a local storage medium one or more portions of the web site included by the web application and wherein the one or more portions of the web site were stored in the local storage medium when the web application was installed, including never accessing any portion of the web site from a remote server, and only accessing the one or more portions of the web site from the local storage medium.

8. The apparatus of claim 7, wherein the web browser is configured to:
    acquire one or more permissions to access one or more system resources from a user of the apparatus; and
    grant or deny access the system resources, based upon the user's permissions, to the web application.

9. A computer-readable medium being tangibly embodied and including executable code that causes an apparatus to:
    execute, via a processor included by the apparatus, a web browser;
    load, via the web browser, the web application, wherein the web application includes a manifest and at least a portion of a web site, wherein the web application was packaged as an installable entity and the web site is self-contained;
    manage, by the web browser, the execution of the web application; and access, via the web browser, from a local storage medium one or more portions of the web site included by the web application and wherein the one or more portions of the web site were stored in the local storage medium when the web application was installed, including never accessing any portion of the web site from a remote server, and only accessing the one or more portions of the web site from the local storage medium.

* * * * *